(12) United States Patent
Jung et al.

(10) Patent No.: US 10,948,270 B2
(45) Date of Patent: Mar. 16, 2021

(54) METHOD AND DEFENSE SYSTEM FOR COMBATING THREATS

(71) Applicant: RHEINMETALL WAFFE MUNITION GMBH, Unterluess (DE)

(72) Inventors: Markus Jung, Eicklingen (DE); Alexander Graf, Uelzen (DE)

(73) Assignee: RHEINMETALL WAFFE MUNITION GMBH, Unterluess (DE)

( * ) Notice: Subject to any disclaimer, the term of this patent is extended or adjusted under 35 U.S.C. 154(b) by 9 days.

(21) Appl. No.: 16/410,631

(22) Filed: May 13, 2019

(65) Prior Publication Data

US 2020/0025531 A1    Jan. 23, 2020

Related U.S. Application Data

(63) Continuation of application No. PCT/EP2017/077695, filed on Oct. 27, 2017.

(30) Foreign Application Priority Data

Nov. 11, 2016  (DE) .................. 10 2016 121 698.4

(51) Int. Cl.
*F41H 13/00* (2006.01)
*F41G 3/14* (2006.01)
(Continued)

(52) U.S. Cl.
CPC .......... *F41H 13/005* (2013.01); *F41G 3/145* (2013.01); *F41G 7/226* (2013.01); *F41G 7/2293* (2013.01); *F41H 11/02* (2013.01)

(58) Field of Classification Search
CPC ........ F41H 13/005; F41G 3/145; F41G 7/226; F41G 7/2293; F41G 11/02
(Continued)

(56) References Cited

U.S. PATENT DOCUMENTS 3,719,829 A * 3/1973 Vaill ................... F41H 13/0012
307/149
3,954,228 A * 5/1976 Davis, Jr. .............. F41G 7/2213
244/3.16
(Continued)

FOREIGN PATENT DOCUMENTS

DE    2846738 A1    5/1980
DE    3202432 A1    8/1983
(Continued)

OTHER PUBLICATIONS

International Search Report dated Jan. 30, 2018 in corresponding application PCT/EP2017/077695.

*Primary Examiner* — Samir Abdosh
(74) *Attorney, Agent, or Firm* — Muncy, Geissler, Olds & Lowe, P.O.

(57) ABSTRACT

It is proposed to make a threat better visible for a defensive measure. In this context, the threat (2) should be imaged more intensely for the defensive measure. For the purposes of more effective imaging, provision is made for the threat to emit a stronger IR signature and thus be able to stand out sufficiently against the background for the defensive measure. The stronger IR signature is caused by heating a surface of the threat, which is realized by a laser weapons system. The defensive measure can better detect this heating and has an IR seeker head to this end.

15 Claims, 1 Drawing Sheet

(51) Int. Cl.
  *F41G 7/22* (2006.01)
  *F41H 11/02* (2006.01)
(58) Field of Classification Search
  USPC .............................................. 89/1.8
  See application file for complete search history.

(56) References Cited

U.S. PATENT DOCUMENTS

| | | | | |
|---|---|---|---|---|
| 3,971,939 A * | 7/1976 | Andressen | ............. | F41G 7/008 250/339.05 |
| 5,050,476 A * | 9/1991 | McKnight | ............... | F41G 7/226 244/3.16 |
| 5,428,221 A * | 6/1995 | Bushman | ............. | F41G 7/2226 250/342 |
| 5,600,434 A * | 2/1997 | Warm | ................... | F41G 7/224 250/201.9 |
| 6,196,497 B1 | 3/2001 | Lankes et al. | | |
| 8,066,218 B2 | 11/2011 | Rubin | | |
| 8,223,061 B2 | 7/2012 | Bannasch et al. | | |
| 8,927,914 B2 | 1/2015 | Eckhardt et al. | | |
| 8,927,935 B1 | 1/2015 | Meline | | |
| 8,941,910 B2 | 1/2015 | Hagen | | |
| 2009/0110019 A1 * | 4/2009 | Houde-Walter | ........ | F41G 3/145 372/55 |
| 2009/0250634 A1 * | 10/2009 | Chicklis | .................. | F41H 11/02 250/492.1 |
| 2009/0283598 A1 * | 11/2009 | Sherman | ................. | F41G 3/145 235/404 |
| 2009/0301336 A1 | 12/2009 | Wardecki et al. | | |
| 2010/0282942 A1 * | 11/2010 | Mosier | .................. | F41H 13/005 250/203.2 |
| 2010/0283988 A1 | 11/2010 | Mosier et al. | | |
| 2012/0154598 A1 | 6/2012 | Houde-Walter et al. | | |
| 2012/0210852 A1 * | 8/2012 | McCants, Jr. | ............ | B64D 1/04 89/1.8 |
| 2012/0211678 A1 * | 8/2012 | Brommer | ................... | F41J 2/02 250/504 R |
| 2012/0213513 A1 * | 8/2012 | Chao | ....................... | F41G 7/224 398/39 |
| 2012/0256088 A1 * | 10/2012 | Balonek | ................. | F41G 3/145 250/330 |

FOREIGN PATENT DOCUMENTS

| | | |
|---|---|---|
| DE | 2929125 C1 | 11/1992 |
| DE | 19724080 A1 | 12/1998 |
| DE | 102005020159 A1 | 11/2006 |
| DE | 102005035251 A1 | 2/2007 |
| DE | 102006047845 A1 | 4/2008 |
| DE | 102011009154 A1 | 7/2012 |
| DE | 102011009459 A1 | 7/2012 |
| DE | 102011104021 A1 | 12/2012 |
| DE | 102011120929 A1 | 6/2013 |
| DE | 102012015074 B3 | 12/2013 |
| DE | 102013014192 A1 | 2/2015 |
| EP | 2051039 A1 | 4/2009 |
| JP | 2004309048 A | 11/2004 |
| JP | 3685406 B2 | 8/2005 |
| WO | WO2005056384 A2 | 6/2005 |
| WO | WO2012062399 A1 | 5/2012 |

* cited by examiner

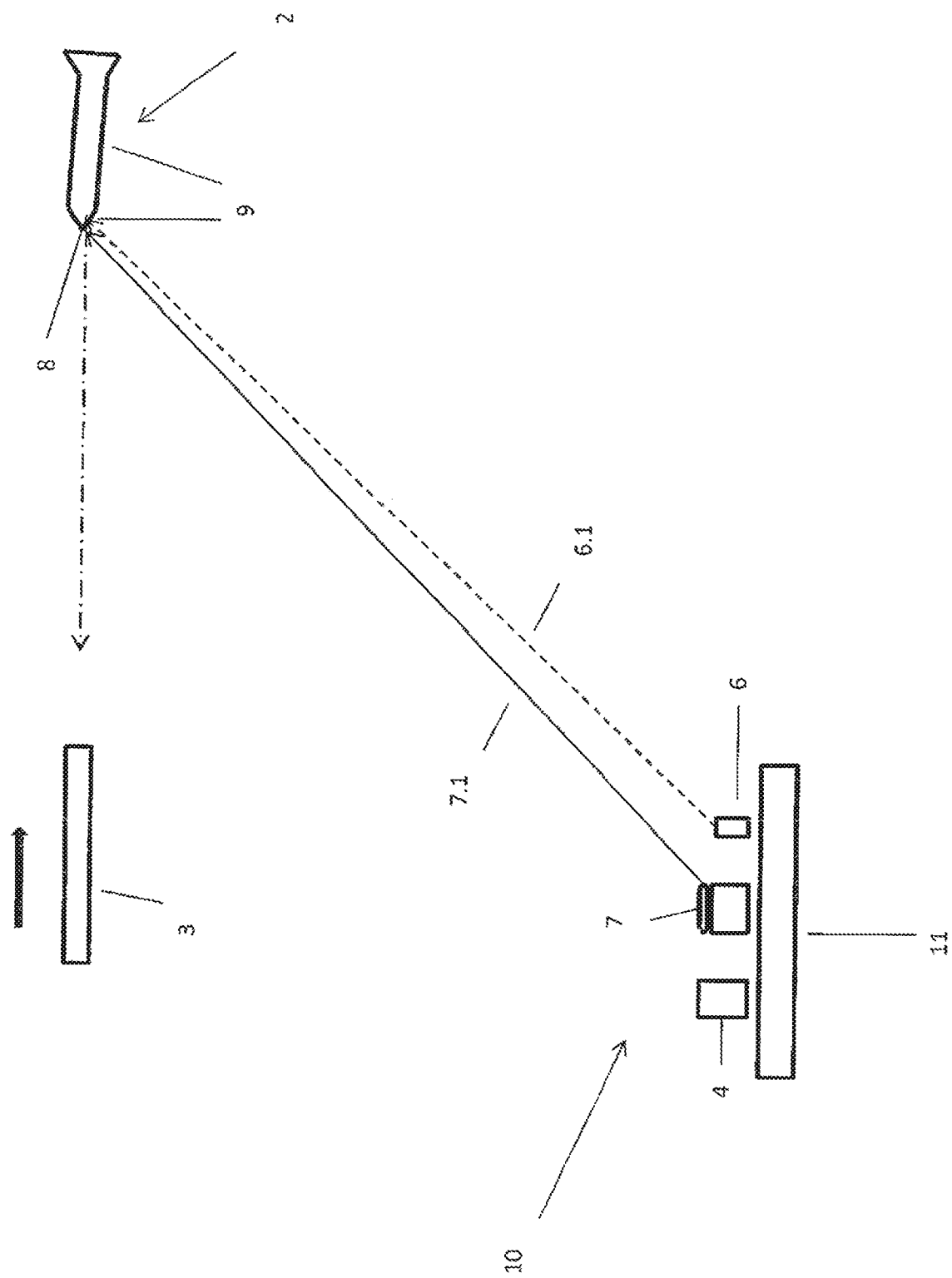

METHOD AND DEFENSE SYSTEM FOR COMBATING THREATS

This nonprovisional application is a continuation of International Application No. PCT/EP2017/077695, which was filed on Oct. 27, 2017, and which claims priority to German Patent Application No. 10 2016 121 698.4, which was filed in Germany on Nov. 11, 2016, and which are both herein incorporated by reference.

BACKGROUND OF THE INVENTION

Field of the Invention

The present invention relates to a method for defense from targets and/or threats, in particular for defense from moving or stationary objects. These include missiles, such as guided missiles, rockets, grenades, helicopters, aircraft, and vehicles. In particular, the method is directed to the recognition and elimination of threats. The invention also relates to a defense system, which comprises at least one laser system and defense means based on IR sensors, such as missiles, guided ammunition, UAVs, etc.

Description of the Background Art

For protection from threats, objects to be protected can be concealed by pyrotechnic illuminants, while the object to be protected can be moved out of the hazard zone, for example. Devices and methods have proven themselves here as are known, inter alia, from DE 10 2005 020 159 B4, which corresponds to US 2009/0301336 which is incorporated herein by reference, or from DE 10 2005 035 251 A1, which corresponds to U.S. Pat. No. 8,223,061, which is incorporated herein by reference. DE 10 2011 009 154 A1 moves the smokescreen directly in front of the attacker, as close as possible in front of the seeker.

Active deception of an intelligent, radar-guided threat is known from DE 10 2011 120 929 A1. The active deception is provided by an antenna array, which is attached on or below the surface of an ammunition body. Both the directional effect and also the radar signal to be emitted are influenced by means of suitable signal processing and geometry. Significant signatures of various targets can thus also be applied to the reflected signal in order to divert the threat from the target.

The use of interfering emitters provides another countermeasure. DE 10 2013 014 192 A1 uses a laser unit having a modulation code to transmit modulated measurement radiation to the flying object. The target acquisition of the seeker is thus disturbed. Furthermore, the measurement radiation reflected from the flying object is detected, correlated with the modulation code, and the distance to the flying object is determined from the correlation. Incorporating a shielding unit having a shielding element guided partially around the optical joint is considered in DE 10 2011 104 021 A1, which corresponds to U.S. Pat. No. 8,927,914, for shielding from interfering radiation.

A method for defense from a missile by means of defense radiation, in which the missile is recognized and classified as such, is discussed in DE 10 2011 009 459 A1. The defense strategy is prepared in dependence on an irradiation angle between the irradiation direction and the flight direction of the missile. This concept proceeds from the consideration of depositing as much radiation energy as possible into selected, functionally-sensitive missile elements of the missile for more reliable damage. It is therefore important to strike the selected missile element at a correct irradiation angle. The technical expenditure linked thereto is high.

The use of a laser source for a DIRCM laser weapon system is also proposed for the self-defense of an aircraft against a missile having IR seeker as disclosed in DE 10 2006 047 845 A1. DE 197 24 080 A1, which corresponds to U.S. Pat. No. 6,196,497, also provides the destruction of a missile having an infrared seeker by an oriented laser beam of high-intensity radiation. For this purpose, lasers or laser weapons having high power and/or radiation are necessary.

A defense system against missiles (rockets) is known from WO 2005/056384 A1. Proceeding from the disadvantage that false targets generally strike the ground as flares and moreover this type of countermeasure is costly and not always effective, this document proposes, as a countermeasure against an IR threat, providing a heat source or signature which is brighter, stronger, and larger or has a higher radiation intensity than the hottest heat source of the aircraft. An attractive heat source or a target for a rocket is thus formed. This brighter, stronger, and larger heat source is then located in the towline of the aircraft.

SUMMARY OF THE INVENTION

It is therefore an object of the present invention to provide a method which efficiently enables simple recognition of a threat and ensures reliable elimination thereof.

The invention is based on the concept of making a target or a threat better visible to a defense measure.

U.S. Pat. No. 5,050,476, which is incorporated herein by reference, relates to a rocket system, which comprises a laser for thermally marking a target, using which a hot point is generated on the target. A heatseeking rocket then picks up the heated point on the target. The laser power for the various seekers in the rocket is dependent in this case on the time at which the laser is switched on. In this case, this is an attack measure. The use for defense from the threat or the target is not discussed here.

The target or the threat is to be imaged more intensively for the defense measure according to the invention. It is unimportant in this case whether the threat or the target itself is formed having an IR seeker or not.

For the more effective imaging, it is provided that the target/the threat itself emits a stronger IR signature and thus can stand out from the background sufficiently using an IR sensor for the defense measure to be emitted. The target/the threat can thus be better detected by the defense measure, i.e., successfully combated by this defense measure. The property is utilized that metals, steel, plastic, and other materials (for example, concrete) absorb laser radiation and thus heat up.

To implement this concept, it is provided that laser radiation heats the target/the threat on its surface. The heating causes a larger heated (red) spot, which is generated on the surface of the target/the threat. This intensified electro-optical imaging of the target/the threat can be better recorded by a missile having an IR seeker as a defense measure.

The stronger radiation is thus induced by heating a surface of the target/the threat, which is preferably implemented by a laser weapon system, which supplies the laser radiation required for this purpose. The defense measure can then better detect this heating, since it stands out better from the background as a heated area.

The switching on of the laser weapon system upon the threat and/or the emission of a time-limited laser beam to the threat is performed after a possible threat has been recognized by a detection device.

If the target/the threat is, for example, a missile without seeker, the tip (ogive, hood) of the missile is preferably heated. If the threat is a missile with seeker, preferably the seeker itself is heated. Furthermore, the fuselage, the wings, and also the tail unit can be heated, individually or in combination.

If the missile (with or without seeker) has a plastic hood, it can be sufficient to destroy this plastic hood. The flight property of the missile can thus be restricted, so that it misses the object to be protected. The missile is thus made unusable.

According to the invention, a laser weapon system and a threat defense are functionally combined with one another. The laser weapon system does not primarily have the object in this case of destroying the threat itself. The laser power to be emitted can thus be less than that of a laser weapon. Moreover, the target accuracy of the threat defense is enhanced by this laser weapon system. The emission or discharge of only one defense measure is thus sufficient to defend from the threat. Moreover, the use of laser weapon systems is expanded. The threat defense is assisted by the laser weapon system.

Laser weapon systems are known in practice. Thus, DE 10 2012 150 074 B3, which is incorporated herein by reference, describes a laser weapon system having a beam directing unit comprising at least one laser generating unit, at least one output stage element, and a beam optical element. A further laser weapon system is also disclosed in WO 2012/062399 A1, which is incorporated herein by reference.

To carry out the method, at least one detection device for detecting a threat, a laser weapon system, preferably a high-performance laser weapon system, and a countermeasure (defense), in this case a rocket (missile), a missile having IR seeker, or an IR drone, etc. are necessary. The use of an illumination laser within the defense system can also be provided. A target seeking system as a tracking system is also advantageous. After the threat has been heated on at least one of its sensitive structural parts, the countermeasure or defense measure can be triggered and used against the threat.

In the case of multiple threats, at least one further laser weapon system can also be used. More than one laser weapon system has the advantage that they can act on only one threat, which lengthens the time window for the threat elimination, since the heating of the sensitive structure parts takes place faster. The laser beams are preferably superimposed on the target for this purpose.

It is proposed that a threat or a target for a defense measure be made better visible. The threat or the target is to be imaged more intensively for the defense measure in this context. For the more effective imaging, it is provided that the threat or the target emits a stronger IR signature and can thus stand out sufficiently from the background for the defense measure. The stronger IR signature is induced by heating a surface of the threat or the target itself, which is implemented by a laser weapon system. The defense measure can better detect this heating and has an IR seeker for this purpose.

In principle, the method can be applied to all possible targets and threats which comprise a material which can absorb laser radiation and thus heat up. The method is applicable for all missiles and not only restricted to threatening IR or RF missiles. The method can moreover also be used for other targets/threats. In addition to the moving targets/threats, stationary targets/threats are also included among them.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE illustrates a block diagram of a defense system according to an exemplary embodiment of the invention.

DETAILED DESCRIPTION

The FIGURE shows a block diagram of a defense system 10 for threat defense. The threat 2 is an incoming missile in the present exemplary embodiment. For the threat defense, in the present exemplary embodiment a rocket (missile) 3 having an IR seeker is provided, which can be discharged from a weapon (launcher).

The defense system 10 comprises at least one detection device 4, which can be a radar or an electro-optical system. A laser 6 can be integrated as an illumination laser into the defense system 10. A laser weapon system is identified by 7, which is to better characterize (identify) the threat 2 according to the invention. The laser weapon system 7 is a high-performance laser in this case. A fire control of the defense system 10 is not shown in greater detail, since it is known. Incoming signals, data, etc., for example, of the detection device 4, etc. are processed via this fire control and output as signals or data to the actuators incorporated in the defense system 10, for example, a weapon not shown in greater detail, the laser 6 or the laser weapon system 7, etc.

The laser weapon system 7 consists at least of a laser unit, a laser (high-performance laser), such as single-resonator oscillator, or master oscillator power amplifier (MOPA), and associated optical units (not shown in greater detail).

By means of the detection device 4, a space to be monitored around an object 11 to be secured (stationary, movable, or moving) is regularly searched and monitored for incoming missiles 2.

With recognition of the threat, the emission of the countermeasure can be initiated by the fire control and the rockets 3 can be sent toward the missile 2 in a known manner. The launcher (not shown in greater detail here) required for this purpose can also be located remotely from the object 11, but is to be functionally connected to the fire control of the defense system 10.

At the point in time of the detection of the threat 2, a target tracking system (not shown in greater detail) can also switch thereto.

In order that a single shot eliminates the missile 2, it is provided that a clearly recognizable target (missile 2) faces the rocket 3. This missile 2 is supposed to stand out better from the background for this purpose. This better standing out is implementable by at least punctiform heating on the threat. In practice, a temperature difference of approximately 2° C. has been shown to be sufficient. At an ambient temperature of 15° C., heating to 17° C. would be sufficient and should be achieved.

As soon as the detection device 4 has detected the incoming missile 2, the option exists that the illumination laser 6 switches to the missile 2 and fixes its laser radiation 6.1 thereon. This fixed point 8 on the missile 2 is preferably located in the visible region of the missile 2 (in general the missile tip). The fixed point 8 can be located in this case on sensitive structural parts of the missile 2, preferably on the tip (ogive, hood), tail unit, etc. of the missile 2. The fixed point 8 can be used by the laser weapon system 7 to align its laser beam 7.1 on the missile 2.

With the aid of the laser beam 7.1, the missile 2 is heated or warmed on its surface 9, preferably in the region of the tip (ogive, hood). The missile 2 thus becomes warmer at this point and images a clearly recognizable spot on the missile 2 for the IR seeker of the rocket 3. The rocket 3 can accurately eliminate the missile 2.

The method can also be applied to stationary threats/targets.

The invention being thus described, it will be obvious that the same may be varied in many ways. Such variations are not to be regarded as a departure from the spirit and scope of the invention, and all such modifications as would be obvious to one skilled in the art are to be included within the scope of the following

What is claimed is:

1. A method for defense from a threat comprising:
   detecting the threat;
   emitting a laser beam of a laser system onto the threat;
   striking the laser beam on a surface of the threat;
   heating, via the laser beam, the surface of the threat at least in a punctiform manner to provide a heated surface; and
   detecting, by an IR seeker of a defense measure, the heated surface of the threat, the defense measure being separate from the laser system.

2. The method as claimed in claim 1, wherein the heating takes place in the front region of the threat.

3. The method as claimed in claim 2, wherein the front region is a tip, ogive, or hood of the threat.

4. The method as claimed in claim 1, wherein a fuselage, wings or tail unit of the threat are heated individually or in combination.

5. A defense system for protecting an object from a threat, the system comprising:
   at least one detection device;
   at least one laser weapon system for heating a surface of the threat; and
   at least one weapon for discharging a defense measure, the at least one weapon for discharging the defense measure being separate from the at least one laser weapon system and the defense measure having an IR seeker to detect the surface heated by the at least one laser weapon system.

6. The defense system as claimed in claim 5, wherein the threat is stationary or moving.

7. The defense system as claimed in claim 5, wherein the defense measure is a rocket, a missile or a drone.

8. The defense system as claimed in claim 5, wherein an illumination laser is incorporated for illumination of the surface of the threat so that the at least one laser weapon system is able to align a laser beam onto the surface of the threat to heat the surface of the threat.

9. An object comprising a defense system as claimed in claim 5.

10. The object as claimed in claim 9, wherein the object is stationary or moving.

11. The method as claimed in claim 1, wherein the defense measure is a rocket, a missile or a drone.

12. The method as claimed in claim 1, further comprising illuminating the surface of the threat via an illumination laser prior to emitting the laser beam, so that the laser system is able to align the laser beam onto the surface of the threat to heat the surface of the threat.

13. The method as claimed in claim 1, wherein the defense measure is provided to eliminate the threat.

14. The defense system as claimed in claim 5, wherein the defense measure is provided to eliminate the threat.

15. The method as claimed in claim 1, wherein the surface of the threat is heated in the punctiform manner to provide the heated surface, the heated surface having a temperature difference of 2° C. from ambient surroundings.

\* \* \* \* \*